United States Patent [19]

Roach

[11] Patent Number: 5,020,729

[45] Date of Patent: Jun. 4, 1991

[54] FLUID JET APPARATUS

[76] Inventor: Jack B. Roach, 1451 Wilson Rd., Clearwater, Fla. 34615

[21] Appl. No.: 483,911

[22] Filed: Feb. 22, 1990

[51] Int. Cl.[5] ......................... B05B 1/00; B23K 31/02; B21D 39/04

[52] U.S. Cl. ........................... 239/600; 239/DIG. 19; 29/890.142; 228/154; 228/161

[58] Field of Search ............ 239/590.3, 600, DIG. 19; 29/890.142; 228/154, 161; 198/380, 493

[56] References Cited

U.S. PATENT DOCUMENTS

| | | | |
|---|---|---|---|
| 1,182,898 | 5/1916 | Eilersten | 239/282 X |
| 2,417,546 | 3/1947 | Giers | 239/590.3 X |
| 2,573,982 | 11/1951 | Ofeldt | 239/590.3 X |
| 3,101,832 | 8/1963 | Wyle et al. | 198/380 |
| 3,603,645 | 9/1971 | Hardy | 198/493 |
| 3,871,295 | 3/1975 | Ackley | 198/380 X |
| 3,963,162 | 6/1976 | Taguchi et al. | 228/154 X |
| 4,236,672 | 12/1980 | Koeberle | 239/590.3 X |
| 4,794,831 | 1/1989 | Cheng | 198/493 X |
| 4,832,266 | 5/1989 | Marvin | 239/590.3 |

FOREIGN PATENT DOCUMENTS

| | | | |
|---|---|---|---|
| 2823003 | 11/1979 | Fed. Rep. of Germany | 228/154 |

OTHER PUBLICATIONS

Brazing Manual, AWS Committee on Brazing and Soldering, 1963, Library of Congress Catalog Card Number 63-11712, pp. 70-77.

Welding Handbook, Chapter 11, vol. Two, Seventh Edition, pp. 407-419, 1978.

*Primary Examiner*—Andres Kashnikow
*Assistant Examiner*—William Grant
*Attorney, Agent, or Firm*—Charles E. Lykes

[57] ABSTRACT

An improved fluid jet apparatus which may be used to ensure a consistent and precise jet of fluid in a vibrating or otherwise unstable environment and a method of manufacturing such an apparatus. The apparatus generally comprises stainless steel base and nozzle members which are securely attached to each other by a silver braze down the length of a drilled hole and a needle valve which is set with a recessed set screw, such set screw being protected by hot wax in the recessed area. The apparatus may further be mounted upon a stainless steel standoff with another recessed set screw which is adapted to sustain sufficient pressure for anchoring the nozzle apparatus in an unstable or vibrating environment.

14 Claims, 3 Drawing Sheets

FLUID JET APPARATUS

BACKGROUND OF THE INVENTION

The invention relates to apparatus useful in providing or directing jet flows of air or fluids. References made to invention disclosure document number 238578 filed by the inventor on Nov. 6, 1989. This is a continuation-in-part application with patent Application No. 07/444,806 filed jointly by the present inventor and Mike Eshelman on Dec. 1, 1989.

There are many situations in which it is necessary to provide a precise burst or stream of air or other fluid. Such a precise burst or stream might need to be at a sufficient pressure to perhaps move an object or to deliver a fluid for application to a precise point. Consequently it is necessary to use fluid jets which may be precisely positioned and which will deliver bursts or streams of the fluid within a narrow range of error and at potentially substantial pressures.

It is frequently necessary to provide such a jet apparatus to be used in conjunction with more substantial machinery. A vibratory feeder bowl may be used to deliver small articles, such as plastic eating utensils, to a given point and may incoporate a system which uses such air jets to perform the functions of separating, sorting, or otherwise ensuring that such eating utensils are properly orientated. Such a device is taught in the parent application, which is fully incorporated herein as an example.

Accordingly, it would be desirable to place such a jets at precise locations with air bursts directed in precise orientations with confidence that such jets would not vary with respect to position and orientation despite the continuous and significant vibration of the bowl system. Additionally, there may be utility for such jets upon automobiles, aircraft, or in heavy machinery wherein fuel or lubricant, air, or other fluids must be precisely delivered in environments subject to violent, sudden motion.

Frequently such jets are positioned such they are readily visible and accessible to those who might work with the served apparatus. Because of their relatively light weight and small size and because they are normally separately constructed and attached to a larger piece of machinery, such jets may be simply tampered with or adjusted by workers who may not fully comprehend the importance of the precise positioning and orientation of the apparatus. Additionally, such jets are normally provided with an elongated or shaped nozzle. Such nozzle may also be exposed and subject to inadvertant contact with objects or persons having reason to move or perform functions in the general proximity of the air jet.

These factors may result in the jets being periodically moved from their optimal position by some form of inadvertant contact. Additionally they could be misadjusted by well intentioned but inappropriate efforts to correct the misdirected bursts caused by an initial inadvertant movement of the jet.

The prior art teaches a variety of fluid jet nozzles. In particular the prior art teaches fluid jet nozzles which are adapted to accomplish specific tasks. For instance U.S. Pat. No. 1,182,898, issued to Eilersten, on May 16, 1916, teaches a nozzle adapted for use to clean out a plumbing system The nozzle is adapted with exterior threads that may be inserted into a pipefitting which is adapted to receive the exterior threads and permit the nozzle into the pipe. The nozzle makes the fluid available to flow in or against the flow direction of the pipe to be cleaned. Accordingly, Eilersten teaches a means and method for directing a jet of fluids in order to accomplish a specific task. Eilersten does not teach a method of permanently affixing one nozzle part to another nor does it teach a means or method of stabilizing a nozzle in a vibrating or unstable environment.

U.S. Pat. No. 4,253,611 issued to Hart, on Mar. 3, 1981, teaches the manufacture of a jet nozzle which is subject to outlet orifice control by use of a shape memory effect (SME) material. The invention of Hart teaches a means and method for automatically and remotely controlling the flow of a fluid through a jet nozzle by the use of applying signals to the SME material. By applying the signals to the SME material, such material can be made to change the shape of the jet nozzle outlet orifice in order to control the flow of the fluid. Hart then teaches a means and method for providing continuous flow control to a jet nozzle. It does not teach a means of manufacturing a stable durable jet nozzle or of securly fastening two components of a nozzle apparatus. Additionally, Hart does not teach a means and method of securing the positioning of such a nozzle in a vibrating or unstable environment nor of preventing detection or protecting against tampering with the nozzle flow.

It should also be noted that a number of prior art vibratory feeder bowl devices teach the use of air nozzles as a means of controlling the flow of articles along the vibratory feeder path. Specifically, such use of an air nozzle is taught by U.S. Pat. No. 3,101,832, issued to Wyle on Aug. 27, 1963; U.S. Pat. No. 4,164,279, issued to Dubuit, on Aug. 14, 1979; and U.S. Pat. No. 4,773,524, issued to Greeves, on Sept. 27, 1988. Additionally, U.S. Pat. No. 4,059,187 issued to Rueff, et al, issued on Nov. 22, 1977, teaches the use of suction valves to control the flow of objects in a conveyor system.

Finally, U.S. Pat. No. 4,872,613 issued to Hucul, et al, on Oct. 10, 1989, which is an assembly for applying a fluid on a workpiece from a storage supply utilizing compressed air as a source of power. The device teaches the use of an injector mounted at a workplace. The device taught in Hucul comprises a series of pressure reservoirs adapted to ensure a consistent measure of air pressure available to accomplish the injection of a less viscous fluid, such as glue, to parts at the workplace.

While each of these air jets or nozzles taught for use in a master apparatus requires the mounting of such nozzles, none of this prior art is meant to provide a durable, stable, and secure form of nozzle apparatus itself nor do such inventions teach a means and method of securely mounting or fastening such a nozzle apparatus. Accordingly what is not taught in the present state-of-the-art is such a jet which is resistant to inadvertant bending, will maintain its orientation and positioning through repeated vibration or vigorous motion of the machinery itself, and which will, with little maintenance, permit a variety of fluids to pass within without much maintenance.

SUMMARY OF THE INVENTION

The inventor has solved the shortcomings of the prior art by providing an air jet which is durable, stable with respect to positioning and orientation, and tamper proof or, at least, amenable to immediate detection of tampering. The invention generally comprises a fluid jet nozzle which is connected with a fluid supply by means of a base member with a silver brazed joint and which may only be repositioned or reoriented with substantial and direct pressure. The fluid supply is in communication with the base member by means of any acceptable form of valve, but a needle valve with a recessed set screw is particularly useful.

The base member is also made of stainless steel and may further be mounted to the master apparatus with a mounting member. The mounting member may further be adapted with a recessed fastening apparatus which may comprise either a set screw or perhaps an allen screw. Because the bolting or fastening surface is recessed, the recessed area could be filled with a putty or paraffin, so that initially positioned, such putty or paraffin would have to be removed in order to accomplish repositioning. Accordingly, any attempt to move the mounting position would be easily detectable by a technician by simple physical examination.

It is then an object of the present invention to provide an accurrate and stable fluid jet suitable for rigid mounting.

It is a further object of the present invention to provide such a fluid jet which is resistant to inadvertant orientation due to undesired or otherwise inappropriate physical contact.

It is a further object of the present invention to provide such a fluid jet which is either tamper-proof or capable of immediate detection of tampering from simple physical examination.

It is a further object of the invention to provide such a fluid jet capable of operation within an environment of constant vibration or sudden violent motion.

It is a further object of the present invention to provide such a fluid jet capable of passing a variety of fluids without corrosion or deterioration.

Other features and advantages of the present invention will be apparent from the following description in which the preferred embodiments have been set forth in conjunction with the accompanying drawings.

BRIEF DESCRIPTION OF THE DRAWINGS

In describing the preferred embodiments of the present invention, reference will be made to the figures and drawings which are attached and incorporated herein. It is useful to initially provide a brief description of them.

DETAILED DESCRIPTION OF THE PREFERRED EMBODIMENTS

As will be seen, the present invention concerns the manufacture of a durable and precise apparatus suitable for stable fluid jet operation in an environment of violent motion, such as the vibratory feeder bowl taught in the parent application. Consequently, since there is a need to tightly clamp the system components and rely upon them to retain a precise shape and orientation, it is necessary to select components of a strong, durable, and non-corrosive material such as stainless steel.

Tubular stainless steel is generally available in several acceptable types, but the dimensions of the exterior surfaces and interior channels are frequently critical. In order to accomplish secure clamping and connection to standard fluid supply lines, it is generally necessary to select a tube of at least 0.25 inch. This size of a tube of stainless steel is not readily available with an interior channel diameter of less than 0.060 inch. This interior channel may be too large for the given application.

Accordingly, in order to provide a fluid jet which may be securely clamped and connected with a fluid supply and still be used to disperse a small jet of fluid in order to be more precise or otherwise conserve pressure and fluid, it is desirable to join a stainless steel base member to a stainless steel nozzle member. The means and apparatus used to accomplish this task are the focus of the preferrred embodiment of the present invention. In an alternate embodiment a means and apparatus for mounting and tamperproofing the apparatus are provided.

Figure 1:
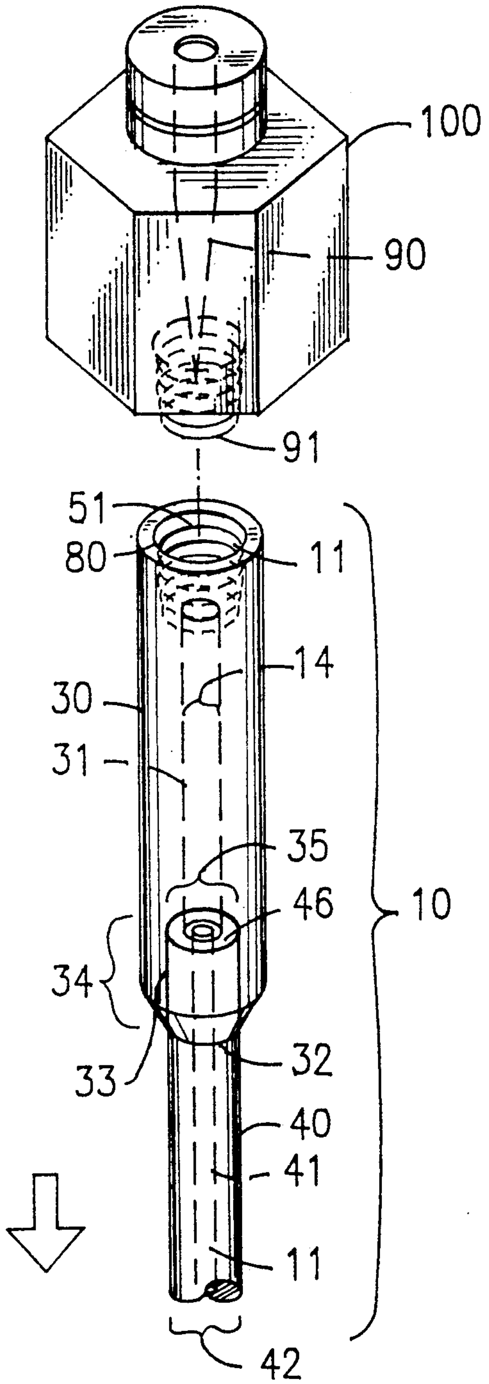
FIG. 1 is a depiction of the base member and nozzle member connection in the interior of the base member.

FIG. 1 depicts a fluid transfer apparatus (10) which further comprises a fluid supply line (11) a needle valve member (90) a base member (30) and a fluid nozzle member (40). Critical to the operation of the present invention is the materials and coupling selected between the base member (30) and the nozzle member (40). The nozzle member (40) is constructed of a series 304 stainless steel. The 304 series stainless steel is suitably machinable and is also quite hard. Accordingly, a nozzle made of such material is of substantial rigidity to withstand inadvertant contact with a person's hand brushing by or the motion of small articles down a conveyor system without being bent out of its desired shape.

A series 304 stainless steel is also used for the base member (30), for essentially the same reasons. The base member (30) may also be made of a series 303 stainless steel which is somewhat more machinable, but less resistant to bending from inadvertant contact. Since the base member (30) is larger and thicker than the nozzle member (40), it it less important that the base member (30) be as inherently resistant to bending as the nozzle member (40).

It is also significant to note that both the base member (30) and the nozzle member (40) are adapted with interior channels (31, 41, respectively). This is why the ability to work with readily available stainless steel tubing is helpful. Stainless steel of series 304 is more readily available in tubular sections and is the best choice for the fluid jet of the present invention.

Of critical importance is the manner and means of fastening the nozzle member (40) to the base member (30). The downstream end (32) of the base member (30) is adapted with a hole (33) which is drilled in a length (34) sufficient to ensure a steady mount for the nozzle member (40) in light of the length and weight and width of the particular nozzle to be used. The interior diameter (35) of the hole (33) drilled in the base member (30) is of a diameter (35) only very slightly larger than the outer diameter (42) of the nozzle member (40). The upstream end (46) of the nozzle member (40) is then slid down into the hole (33) drilled in the base member (30).

These two members (30, 40) are then brazed together with a silver brazing material. A 56 percent silver cadmium free silver braze would be acceptable. Such a silver braze is well known in the ordinary skill of the art and will not be further described here except to say that any brazing material suitable for noncorrosive, fluid tight, and rigid interconnection between stainless steel members as presently taught may be used. If it is desired to use a weaker material than 56% silver braze, it may be necessary to use a longer hole (33).

Figure 2:
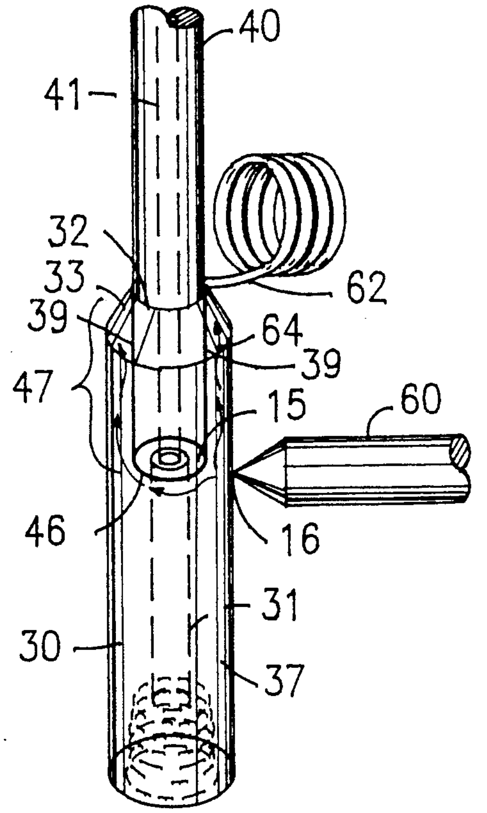
FIG. 2 depicts the application of the silver braze to the joint between the base and nozzle members.

The method of brazing these two components is as depicted in FIG. 2. A heat source (60) is applied to the base member (30) on the outside diameter (37) at some point (16) very near or slightly upstream from from the end (15) of the base member hole (33). The silver braze (62) is positioned at the downstream end (32) of the base member (30) against the nozzle member (40). As the heat (64) flows to the downstream end (38) of the base member (30) the silver braze (62) melts and is permitted to thoroughly run down into all of the space (39) between the base member (30) and the nozzle member (40).

The resulting silver braze connection (47) is very secure and will itself withstand inadvertent contact during operation of the fluid jet apparatus. Additionally, the use of such a silver braze with a stainless steel components results in a completely non-corrosive interior path for the fluid so that a variety of fluids, including both liquids and gases, may be passed through the interior channels (31, 41) of the base member (30) and the nozzle member (40) without resulting in corrosion.

It is important to describe the relationships between the sizes and shapes of particular critical surfaces of the base member (30) and nozzle member (40) and their respective interior paths (31, 41). Because of material availability, cylindrical, tubular portions are normally used for each.

In order for the apparatus to properly function, it is necessary for the outer diameter (42) of the nozzle member (40) to be larger than the diameter (14) of the interior path (31) of the base member (30). The interior end (15) of the downstream hole (33) and the upstream end (46) of the nozzle member (40) should be substantially planar so that they will fit up against one another. As generally mentioned before, the interior diameter (35) of the downstream hole (33) in the base member (30) must be slightly larger (by 0.003 inch is a suitable margin) than the outer diameter (42) of the nozzle member (40) so that the upstream end (46) of the nozzle member (40) will slide into the downstream base member hole (33) and the space (39) between the components (30, 40) will be appropriate for brazing.

Figure 3:
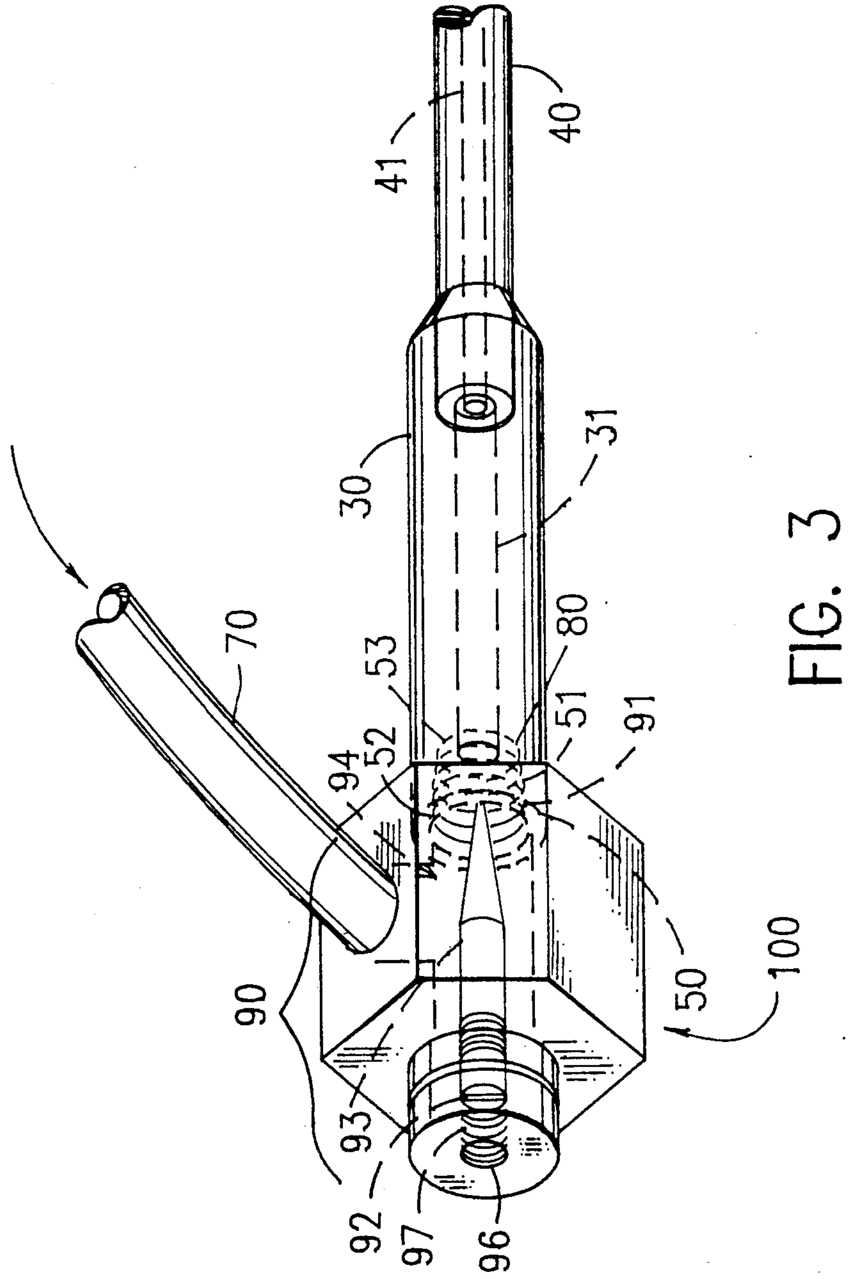
FIG. 3 depicts the fluid system from the air supply to the nozzle, including the interior needle valve and recessed set screw.

As depicted in FIG. 3, at the upstream end (50) of the base member (30) a tapped hole (80) is made in order to facilitate the connection of the base member (30) with a fluid supply (70). The thread (51) made in the tapped hole (80) is very slightly tapered so that the outer portion (52) of the hole (80) is slightly larger in diameter than the inner portion (53) of the hole (80). This hole (80) is threaded to accommodate the male screw end (91) of a needle valve apparatus (90). The tapering of this threaded hole (80) should facilitate a tight enough seal to prevent any leakage between the needle valve apparatus (90) and the base member (30). However, if after repeated use or due to any material or other form of imperfection a leak appears it may be corrected by the use of a sealing gasket (not depicted) around the screw member (91) of the needle valve apparatus (90).

The needle valve apparatus (90) further comprises an adjusting set screw (92) which is used to move a needle (93) in and out of a fluid transfer area (94) so as to relatively open and close the available space for transfer of fluid from the needle value apparatus (90) to the base member (30). Because an object of the present invention is to ensure that the desired parameters of pressure and direction of fluid flow remain stable, this adjusting set screw (92) may be recessed down into the housing (100) of the needle valve apparatus (90). When the appropriate valve setting has been achieved then hot wax (96) may be placed down into the resulting recessed region (97) and allowed to cool and harden.

This hot wax (96) serves to obscure the existence of a needle valve adjustment so that a casual passer-by would be unaware of its existence. However, any one who desired to adjust the needle valve setting would have to first clear the hot wax from this region in order to reach the adjusting set screw. Accordingly, even if someone were to know of and have the means to adjust the set screw (92), it would be a simple matter for an inspector to determine whether or not it had been so adjusted.

Figure 4:
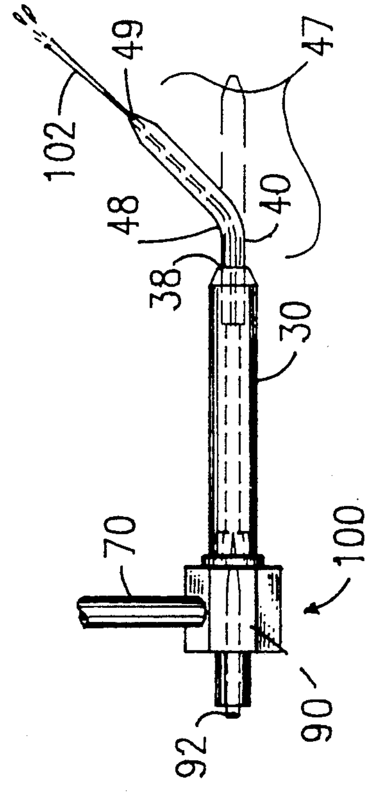
FIG. 4 depicts an overall unmounted fluid jet apparatus in a typical form.

FIG. 4 depicts a typical application of the present invention as manufactured. The needle valve apparatus (90) is housed within a hexagonal housing (100) which serves to permit tightening of it into the base member (30). The needle valve adjusting set screw (92) is depicted prior to recession into its housing (100) and in line with the interior channels (not depicted) of the base member (30) and the nozzle member (40). It can be seen that the nozzle member (40) further comprises an elongated nozzle (47) which may be bent (48) in order to direct the dispersement of a fluid (102) through an orifice (49). The connect ion of the needle valve apparatus (90) and the fluid supply (70) may be by any acceptable means and is beyond the scope of this invention.

There may be occasions in which it will be desirable to mount the stable fluid control system taught in the present invention to a master apparatus, such as a vibratory feeder bowl, in order to provide the fluid dispersement upon a particular point or through a particular region. Other examples of such apparatus might be a lubrication port on a high speed machine, or any similar device in which precise dispersement of a fluid is necessary upon a specific portion of a device or in a specific region. In general, the invention is meant to consider any device which may be subject to rapid vibrational or other movement. In such applications the fluid transfer apparatus may be mounted to the master device with a stainless steel standoff.

Figure 5:
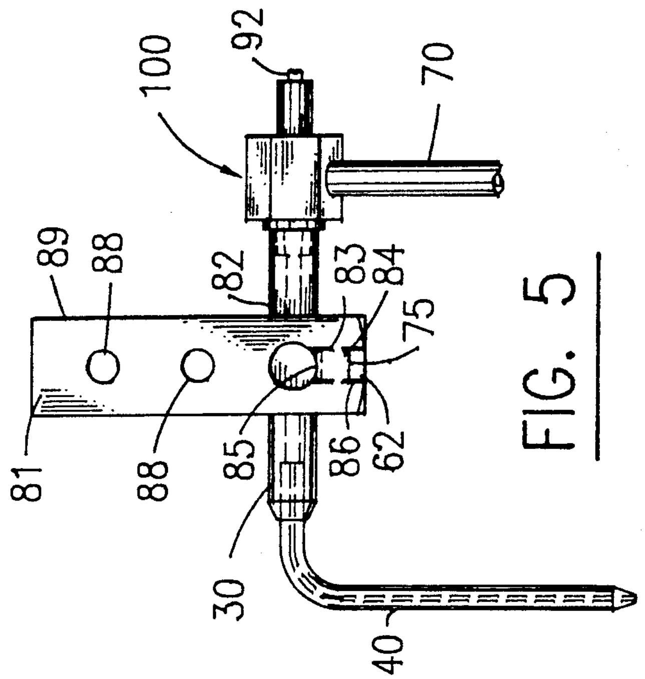
FIGS. 5 and 5A depict a mounted fluid transfer apparatus from the side and top respectively.
Figure 5A:
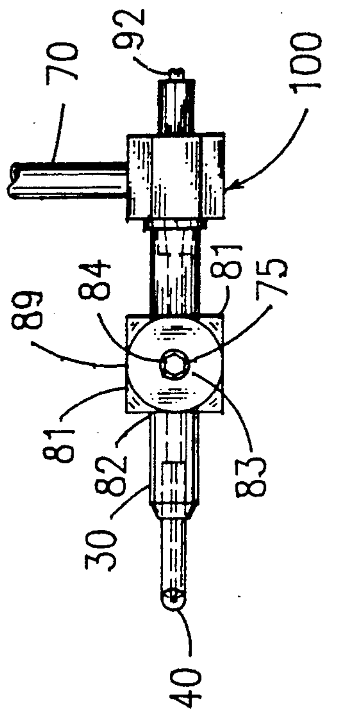

As depicted in FIGS. 5 (side view) and 5A (top view) a standoff (89) which would be appropriate for use is depicted. It can be seen that the standoff (89) comprises flat surfaces (81) for clamping, welding or otherwise being fastened upon a portion of the master device. The standoff (89) further may be adapted with mounting holes (88) for bolting upon a surface of the master apparatus. The standoff (89) additionally comprises at least one hole or path (82) for accepting the base member (30) of the fluid transfer apparatus. Series 303 stainless steel has been found to be an acceptable material for this application.

Such a standoff is further adapted with a threaded hole (83) through which a mounting set screw (84) may be passed. The threaded hole (83) extends down into the base member path (82) so that a mounting set screw (84) may be turned through the hole until its fastening end (85) makes contact with the base member (30). By selecting a proper length for the threaded hole (83) and mounting set screw (84) it is possible to also secure t he mounting member set screw by using hot wax (62) In Its recessed regIon (86) to serve as both a tamper proofing and tamper detecting mechanism.

Additionally, because it will typically be necessary to tighten the mounting member set screw (84) to a very high level of tension, it may be desirable to adapt the mounting set screw adjusting end (75) to receive an allen wrench rather than the head of a screw driver. This will not only facilitate secure tightening but will also minimize the likelihood of tampering since casual passers-by would be less likely to be in possession of an allen wrench than a simple screw driver.

The fluid transfer system as taught in the present invention may be manufactured to accommodate virtually any reasonable fluid path diameter and length. It is noted, however, that the general application of such a device is for jets of air or fluid similar that found on small machinery and engines rather than on large flows of air and fluid. It should also be noted that, while such precise dimensions are not claimed herein, that certain relationships must exist between the size and length of the nozzle tapped in the base member in order to ensure the necessary strength and stability of the soldered joint.

The use of particular varieties of stainless steel has been suggested throughout this description. The inventor has found the use of the suggested materials helpful in light of the need for the base and nozzle members to be strong and machinable while retaining the requisite strength and noncorrosive properties. It should be noted that any material which adequately fulfills as many of these properties as may be required for a given application may be substituted without departing from the spirit and scope of this invention. The reference to standard series of stainless steels has incorporated the referencing provided by *The Machinery's Handbook*, revised 21st edition, by Oberg, Jones, and Horton; Industrial Press, Inc.; 1979. A copy of pages 2104 and 2105 is attached and incorporated by this reference.

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. An improved fluid jet nozzle apparatus, the apparatus comprising:

a rigid nozzle member comprising an elongated exterior surface, an elongated inner cylindrical open channel which is generally parallel with said exterior surface, a nozzle end which is suitable for dispersement of a fluid, and an intake end, said intake end having a planar surface which is perpendicular with the length of said elongated exterior surface and inner channel;

a rigid base member, said base member further comprising an exterior surface and an inner cylindrical channel, said inner cylindrical channel being smaller than the said nozzle member exterior surface;

said base member being further adapted with a drilled hole on one end, said hole being cylindrical and having a diameter within a range only slightly more or less than 0.003 of an inch larger than the exterior surface diameter of said nozzle member, said hole further having an end within said base member which is planar and perpendicular to said base member inner channel and is in fluid communication with said base member inner channel;

said base member and said nozzle member being attached to each other by means of a durable and noncorrosive silver braze, said braze extending between the exterior surface of the said nozzle member and the interior surface of the drilled hole of the base member at all points while the intake end of the nozzle member is received through the drilled hole of the base member until said planar surface of said nozzle member is in firm contact with said planar end of said drilled hole;

said base member further comprising a threaded hole on an end opposite said nozzle member receiving end, said thread adapted to receive a screw end of a needle valve member in a fluid-tight manner except for a needle valve member interior channel which is adapted to permit a flow of fluid from the interior channel of said needle valve member into the inner channel of said base member;

said needle valve member further comprising a fluid-tight housing, a needle valve with a threaded exterior surface and a needle valve channel with interior threads matching said needle valve threads so as to permit adjustment of the size of the said needle valve member interior channel by turning said needle valve through said matching threads by means of a set screw end on said needle valve; and said set screw end further adapted so that it may be recessed within a recessed portion of said needle valve housing and secured in place by filling said needle valve housing recessed portion with a hardening fluid, semi-fluid, or semi-solid substance.

2. The invention described in claim 1 in which said base member and said nozzle member are made of a series 304 stainless steel.

3. The invention described in claim 2 in which said base member and said nozzle member are tubular portions of stainless steel.

4. The invention described in claim 3 in which said stainless steel is standard 304 series.

5. The invention described in claim 1 in which said braze is a silver alloy braze of at least 56 percent silver.

6. The invention described in claim 2 in which said braze is a silver alloy braze of at least 56 percent silver.

7. The invention described in claim 3 in which said braze is a silver alloy braze of at least 56 percent silver.

8. The invention described in claim 4 in which said braze is a silver alloy braze of at least 56 percent silver.

9. A method for manufacturing a stable fluid jet nozzle, the method comprising the steps of:

configuring a stainless steel base member and an elongated cylindrical stainless steel nozzle member each with cylindrical inner channels from an upstream end to a downstream end so that the nozzle member inner channel is parallel with its length and that the diameter of the base member inner channel is smaller than the exterior diameter of the nozzle member;

forming said nozzle member with a planar end which is perpendicular to the length of said inner channel;

enlarging said downstream end of said base member inner channel with a cylindrical hole such that the diameter of said hole is within a range of only slightly more or less than 0.003 of an inch larger than the diameter of the exterior surface of the elongated nozzle member, said hole having an interior end which is planar and perpendicular with said base member inner channel;

inserting said planar end of said nozzle member through said hole until said nozzle member planar end is in firm contact with said downstream base member hole interior end and holding said base member and nozzle member in such place;

positioning a supply of silver braze to the exterior end of said hole while applying sufficient heat to the exterior surface for said base member at a point immediately upstream from the interior end of said downstream hole at a point on said base member exterior surface, so that said heat radiates throughout said base member from the interior end of said hole to the exterior end of said hole with sufficient intensity to cause said braze to melt and flow down into all the space between the nozzle member exterior surface which has been inserted into the base member downstream hole and the interior surface of the hole and permitting said silver braze to harden; and connecting the upstream end of said base member inner channel in fluid communication with a supply of fluid to be disbursed.

10. The invention described in claim 9 in which said stainless steel is of standard series 304.

11. The invention of claim 10 in which said base member and nozzle members are made of standard series 304 tubular steel.

12. The invention of claim 9 in which said braze is a silver alloy braze of at least 56 percent silver.

13. The invention of claim 10 in which said braze is a silver alloy braze of at least 56 percent silver.

14. The invention of claim 11 in which said braze is a silver alloy braze of at least 56 percent silver.

* * * * *